United States Patent [19]

Martin

[11] Patent Number: 5,582,265
[45] Date of Patent: Dec. 10, 1996

[54] POWER STEERING ASSEMBLY

[75] Inventor: Jon W. Martin, Losalamitos, Calif.

[73] Assignee: TRW Inc., Lyndhurst, Ohio

[21] Appl. No.: 451,560

[22] Filed: May 26, 1995

[51] Int. Cl.$^6$ ................................. B62D 5/083
[52] U.S. Cl. .................... 180/426; 180/429; 91/375 R
[58] Field of Search .................................. 180/417, 426, 180/427, 429, 428; 91/375 R; 74/388 PS

[56] References Cited

U.S. PATENT DOCUMENTS

| | | | |
|---|---|---|---|
| 3,058,321 | 10/1962 | Aske | 464/89 |
| 3,096,106 | 7/1963 | Wanner | 403/197 |
| 3,138,069 | 6/1964 | Bishop | 91/375 A |
| 3,859,821 | 1/1975 | Wallace | 464/89 |
| 4,667,530 | 5/1987 | Mettler et al. | 74/493 |
| 4,957,468 | 9/1990 | Otsuka et al. | 180/441 X |
| 5,213,174 | 5/1993 | Adams | 180/427 |
| 5,287,792 | 2/1994 | Betros et al. | 91/375 R |
| 5,469,929 | 11/1995 | Dadak et al. | 180/429 |

Primary Examiner—Brian L. Johnson
Assistant Examiner—Victor E. Johnson
Attorney, Agent, or Firm—Tarolli, Sundheim, Covell, Tummino & Szabo

[57] ABSTRACT

A hydraulic power rack and pinion steering assembly (10) includes a valve core (98) and a valve sleeve (100) which are supported for relative rotation. A damping ring assembly (150) is interposed between the valve core (98) and the valve sleeve (100) to reduce vibrations and thereby to attenuate noise. The damping ring assembly (150) includes an inner ring (160) press fit on the valve core (98) and an outer ring (170) press fit in the valve sleeve (100). An elastomeric member (180) is disposed in the annulus between the inner ring (160) and the outer ring (170). The elastomeric member is bonded to the inner ring (160). Ribs (200) on the outer ring (170) are received in grooves (240) in the elastomeric member (180). A small gap (260) between the elastomeric member (180) and the outer ring (170) enables initial relative movement between the outer ring (170) and the inner ring (160) before the elastomeric member (180) engages the ribs (200).

10 Claims, 4 Drawing Sheets

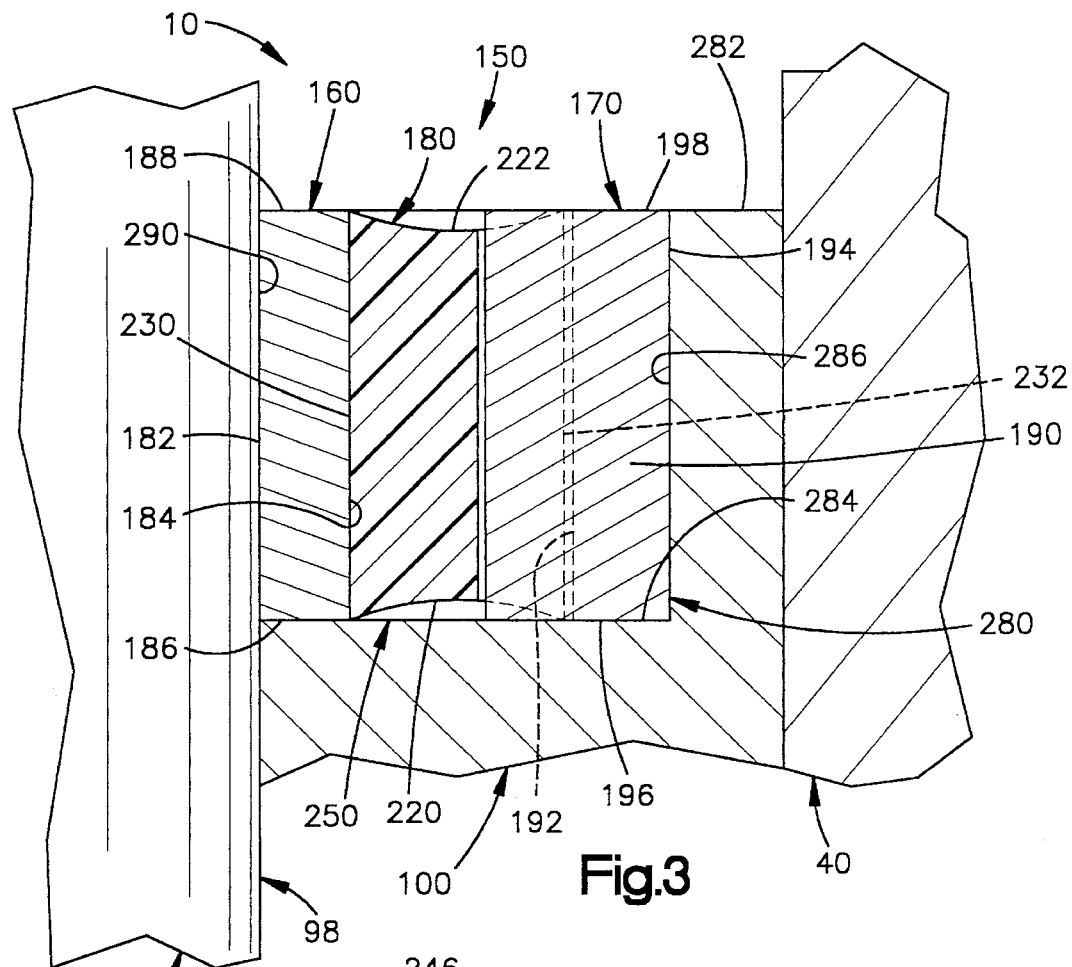
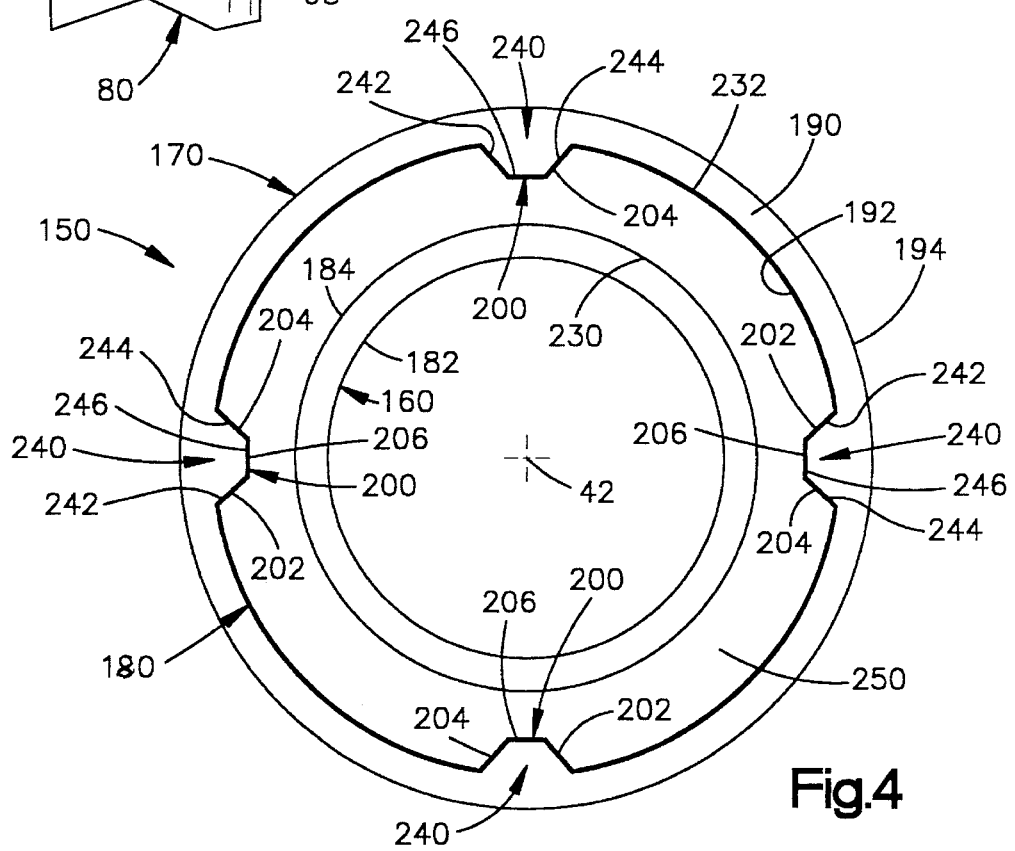

POWER STEERING ASSEMBLY

BACKGROUND OF THE INVENTION

1. Technical Field

The present invention relates to a hydraulic power steering assembly for steering a vehicle and, particularly, to a damping ring assembly for attenuating noise caused by vibrations in a hydraulic power steering assembly.

2. Description of the Prior Art

Hydraulic power steering assemblies for steering a vehicle are known. One common type of hydraulic power steering assembly is a power assisted rack and pinion steering assembly having a housing which supports a rack for longitudinal movement to steer the vehicle. The housing contains a hydraulic control valve. The control valve responds to rotation of an input shaft connected with the vehicle steering wheel to regulate the flow of hydraulic fluid to a hydraulic cylinder containing a piston that moves the rack. The control valve includes a valve core and a valve sleeve which are supported for rotation relative to each other and which have surfaces which define hydraulic fluid flow paths through the valve assembly.

The pressurized flows of hydraulic fluid in the control valve can cause vibrations in the valve assembly in the nature of undesired oscillation between the valve core and the valve sleeve. The vibrations in the control valve can cause noises that are audible to an occupant of the vehicle. It is desirable to minimize undesired oscillation between the valve core and the valve sleeve, so as to minimize audible noise emanating from the steering gear.

SUMMARY OF THE INVENTION

The present invention is a hydraulic power steering apparatus comprising a rotatable input member, a rotatable output member, and a housing supporting the input member and the output member for rotation relative to each other about an axis. The apparatus includes a hydraulic valve comprising a valve core and a valve sleeve. The valve core has a cylindrical surface and is supported in the housing for rotation with the input member relative to the output member and to the valve sleeve. The valve sleeve has a cylindrical surface adjoining the cylindrical surface of the valve core, and is supported in the housing for rotation with the output member relative to the input member and to the valve core. The valve has a centered condition in which the valve core and the valve sleeve are in a predetermined first relative position.

The apparatus includes noise attenuating means for attenuating noise caused by vibrations of the valve core relative to the valve sleeve. The noise attenuating means comprises a damping ring assembly extending circumferentially between the valve core and the valve sleeve. The damping ring assembly comprises first and second tubular members which are spaced apart radially from each other and which define between them an annulus. Each one of the first and second tubular members is connected for rotation with a respective one of the valve core and the valve sleeve. A bearing member is disposed in the annulus and is connected for movement with the first tubular member. An elastomeric member is disposed in the annulus and is connected for movement with the second tubular member. The bearing member is spaced apart from the elastomeric member when the valve is in the centered condition. The bearing member is engageable with the elastomeric member, upon movement of the valve from the centered condition, to transmit rotational force between the bearing member and the elastomeric member and thereby between the first and second tubular members.

In a preferred embodiment of the invention, the valve core is rotatable up to about one-half degree relative to the valve sleeve prior to engagement of the bearing member with the elastomeric member. Accordingly, when the valve is in or is close to the centered condition, the damping ring assembly does not affect the relationship between the driver input to the steering apparatus and the amount of power assistance provided by the steering apparatus.

BRIEF DESCRIPTION OF THE DRAWINGS

Further features of the present invention will become apparent to those skilled in the art to which the present invention relates from reading the following specification with reference to the accompanying drawings, in which:

FIG. 3 is an axial sectional view showing a damping ring assembly included in the steering assembly of FIG. 1;

FIG. 4 is a radial sectional view of the damping ring assembly of FIG. 3;

DESCRIPTION OF PREFERRED EMBODIMENT

Figure 1:
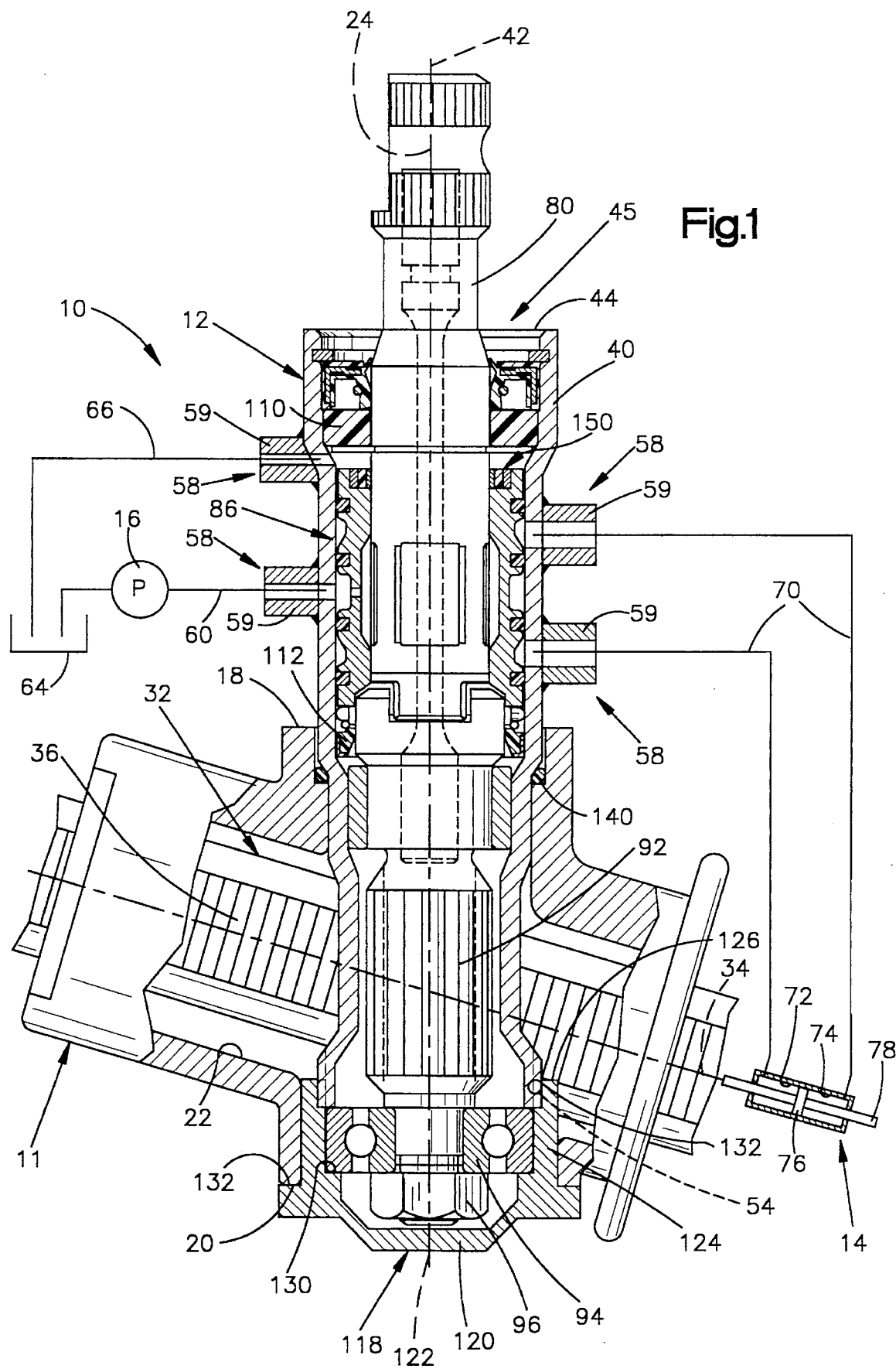
FIG. 1 is a sectional view of a hydraulic power assisted rack and pinion steering assembly in accordance with the present invention.
Figure 2:
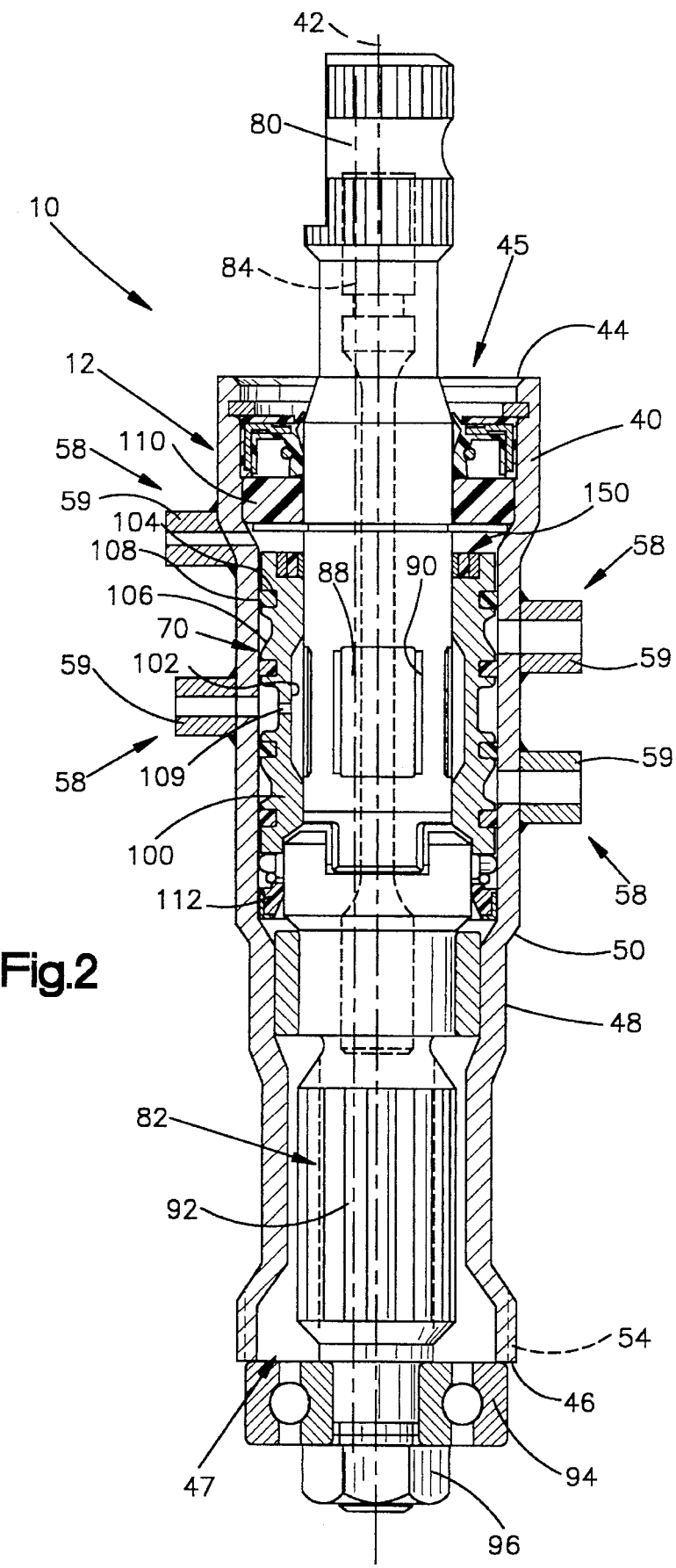
FIG. 2 is a sectional view of a part of the steering assembly of FIG. 1 including a hydraulic fluid control valve.

The present invention relates to a hydraulic power steering assembly for steering a vehicle. The present invention is applicable to various hydraulic power steering assembly constructions, including rack and pinion steering assemblies and worm gear steering assemblies. As representative of the present invention, FIG. 1 illustrates a hydraulic power assisted rack and pinion steering assembly 10. The steering assembly 10 is operable to turn the steerable wheels (not shown) of a vehicle to effect steering of the vehicle.

The steering assembly 10 includes a damping ring assembly 150, described below in detail. With the exception of the damping ring assembly 150, the steering assembly 10 is of the type shown in U.S. Pat. No. 5,213,174 and includes a rack housing 11 which supports an elongate rack 32 for movement along a longitudinal axis 34 of the rack. The rack 32 has a plurality of rack teeth 36. Opposite end portions (not shown) of the rack 32 are connected in a known manner by vehicle steering linkage to the steerable wheels of the vehicle.

The steering assembly 10 includes a control valve assembly 12. The control valve assembly 12 includes a cylindrical tubular steel member 40 having a longitudinal axis 42. The tubular steel member 40 has an annular upper surface 44 surrounding a circular upper opening 45 centered on the axis 42. An annular lower surface 46 surrounds a circular lower opening 47 also centered on the axis 42. The tubular steel member 40 has an outer surface 48 which includes an annular portion 50 at a location between the upper and lower ends of the tubular steel member 40.

The tubular steel member 40 includes ports 58 for conducting hydraulic fluid into and out of the tubular steel member. Each port 58 includes a flare nut 59 welded to the tubular steel member 40 over an associated aperture in the tubular steel member. The flare nuts 59 are for connecting hydraulic lines, shown schematically in FIG. 1, to the tubular steel member 40. A hydraulic supply line 60 connects a pump 16 and a hydraulic reservoir 64 with one port 58 in the tubular steel member 40. A hydraulic exhaust line 66 connects another port 58 with the reservoir 64. A pair of hydraulic lines 70 connect each one of a pair of ports 58 with respective working chambers 72 and 74 on opposite sides of a piston 76 in the hydraulic cylinder 14. A piston rod 78 is connected to the rack 32.

The control valve assembly 12 also includes an input shaft 80, a pinion 82, a torsion bar 84 and a control valve 86. The input shaft 80 is connected for rotation with a steering wheel (not shown) of the vehicle. The input shaft 80 is supported in the tubular steel member 40 for rotation about the axis 42 in response to rotation of the vehicle steering wheel. The input shaft 80 has a cylindrical outer surface in which four recesses 88 are defined by edges 90. The recesses 88 are centered at locations circumferentially spaced 90° apart about the axis 42.

The pinion 82 has an array of pinion teeth 92 which are in meshing engagement with the rack teeth 36 on the rack 32. The pinion 82 is supported in a bearing 94 for rotation about the axis 42. The bearing 94 is held in place against the annular lower surface 46 of the tubular steel member 40 by a nut 96 on the end of the pinion 82.

The torsion bar 84 extends along the axis 42 and connects the input shaft 80 with the pinion 82. The torsion bar 84 permits the input shaft 80 and the pinion 82 to rotate slightly relative to each other in response to a steering torque.

The control valve 86 includes a valve core 98. The valve core 98 is the portion of the input shaft 80 which includes the recesses 88 and the edges 90 on the input shaft. The cylindrical outer surface of the input shaft 80 thus forms a cylindrical outer surface of the valve core 98.

The control valve 86 also includes a cylindrical valve sleeve 100. The valve sleeve 100 is connected with the pinion 82 for rotation with the pinion relative to the valve core 98. The valve sleeve 100 has a cylindrical inner surface, adjoining the cylindrical outer surface of the valve core 98, in which are formed a plurality of recesses 102. An outer surface of the valve sleeve 100 has a plurality of annular grooves 104 and recesses 106.

A plurality of O-ring seals 108, preferably formed of hydrogenated nitrile butyl rubber, are disposed in the grooves 104. The seals 108 block fluid flow between the recesses 106. A plurality of passages 109, one of which is shown in FIG. 3, interconnect certain recesses 106 at the outer surface of the valve sleeve 100 with certain recesses 102 at the inner surface of the valve sleeve 100. The passages 109, the recesses 106 and 102 on the valve sleeve 100, and the recesses 88 on the input shaft 80 thus define hydraulic fluid flow paths through the control valve 86 between the ports 58.

The control valve 86 is supported in the tubular steel member 40 in a chamber defined between an upper hydraulic seal 110 and a lower hydraulic seal 112. The upper and lower hydraulic seals 110 and 112 block the flow of hydraulic fluid from the chamber axially toward the upper and lower openings 45 and 47 in the tubular steel member 40.

The upper and lower hydraulic seals 110 and 112 are preferably formed of hydrogenated nitrile butyl rubber. A cap 118 secures the lower end (as viewed in FIG. 1) of the tubular steel member 40 in the rack housing 11.

When the input shaft 80 and the pinion 82 rotate relative to each other in response to a steering torque applied to the input shaft, the valve core 98 rotates relative to the valve sleeve 100. The recesses 88 on the input shaft 80 thus rotate relative to the recesses 102 on the inner surface of the valve sleeve 100. When the recesses 88 rotate relative to the recesses 102, the hydraulic fluid flow paths through the valve 86 are adjusted so that certain hydraulic fluid flow paths become relatively restricted and certain hydraulic fluid flow paths become relatively unrestricted. A pressurized flow of hydraulic fluid is thereby directed through the control valve 86 from the pump 16 to one side of the piston 76 in the hydraulic cylinder 14, and hydraulic fluid is exhausted from the other side of the piston 76 through the control valve 86 to the reservoir 64.

As an example, when a steering torque is applied to the input shaft 80 in a first rotational direction, a pressurized flow of hydraulic fluid is directed to the working chamber 72 on the left side (as viewed in FIG. 1) of the piston 76. The piston 76 and the piston rod 78 move to the right as viewed in FIG. 1. The rack 32 is moved longitudinally with the piston rod 78, to the right as viewed in FIG. 1, to effect a steering movement of the associated steerable vehicle wheels in a first direction. As the rack 32 moves with the piston rod 78, the pinion 80 is rotated by the moving rack 32 to cause follow-up rotational movement of the valve sleeve 100 relative to the valve core 98 on the input shaft 80. When the valve sleeve 100 is thus moved to a position in which it is no longer rotationally displaced from the valve core 98, the hydraulic fluid flow paths through the control valve 86 are in a re-adjusted position so as to stop longitudinal movement of the piston rod 78 and the rack 32, and to stop steering movement of the associated steerable vehicle wheels.

When a steering torque is applied to the input shaft 80 in a second rotational direction opposite to the first rotational direction, a pressurized flow of hydraulic fluid is directed to the working chamber 74 on the right side (as viewed in FIG. 1) of the piston 76. The piston 76 and the piston rod 78 move to the left as viewed in FIG. 1. The rack 32 is moved longitudinally with the piston rod 78 to the left as viewed in FIG. 1 to effect a steering movement of the associated steerable vehicle wheels in a second direction opposite to the first direction. Movement of the rack 32 to the left likewise causes follow-up rotational movement of the pinion 82 relative to the input shaft 80 to stop steering movement of the steerable wheels.

The damping ring assembly 150 (FIG. 4) includes an inner tubular member or inner ring 160, an outer tubular member or outer ring 170, and a damping member or elastomeric member 180. The inner ring 160 (FIGS. 3 and 4) is an annular member made from stainless steel or another suitable material preferably matching the coefficient of thermal expansion of the material of the input shaft 80. The inner ring 160 has parallel, axially extending inner and outer side surfaces 182 and 184. The side surfaces 182 and 184 each have a cylindrical configuration and are centered on the axis 42 (FIG. 1). The inner ring 160 also has parallel, radially extending inner and outer end surfaces 186 and 188. The end surfaces 186 and 188 each have an annular configuration and extend perpendicular to the axis 42.

The outer ring 170 is an annular member made from stainless steel or another material which preferably matches the coefficient of thermal expansion of the valve sleeve 100. The outer ring 170 is axially coextensive with the inner ring 160. The outer ring 170 includes a cylindrical main body portion 190 which has parallel, axially extending cylindrical inner and outer side surfaces 192 and 194 centered on the axis 42. The main body portion 190 of the outer ring 170 also has parallel, radially extending inner and outer end surfaces 196 and 198. The end surfaces 196 and 198 each have an annular configuration and extend perpendicular to the axis 42.

The outer ring 170 includes four axially extending ribs 200. The ribs 200 are formed as one piece with the main body portion 190 of the outer ring 170. The ribs 200 project radially inward from the inner side surface 192 of the main body portion 190, in a direction toward the inner ring 160. Each rib 200 has first and second non-parallel side surfaces 202 and 204 which are connected by an inner end surface 206 extending parallel to the axis 42. Each rib 200 thus has a truncated conical cross-sectional configuration, as best seen in FIG. 4.

The elastomeric member or damping member 180 is interposed between the inner ring 160 and the outer ring 170. The elastomeric member 180 is made from a material which is selected to withstand the high temperature and exposure to oil in the environment of the control valve 86. A preferred material for the elastomeric member 180 is hydrogenated nitrile butyl rubber (HNBR). Alternative materials which are suitable for the elastomeric member 180 are nitrile butyl rubber (NBR), neoprene, and fluoro rubber. The elastomeric member 180 preferably has a very low degree of resilience so that it has a damping effect between the inner ring 160 and the outer ring 170.

The elastomeric member 180 is molded in situ between the inner ring 160 and the outer ring 170. The elastomeric member 180 when molded between the inner ring 160 and the outer ring 170 has opposite axial end surfaces 220 and 222 which bow axially inward as seen in FIG. 3. This bowing of the end surfaces 220 and 222 can reduce notch and tear sensitivity, and also can provide expansion room for the elastomeric member 180 in the event of swelling from the oil and heat within the environment of the control valve 86.

The elastomeric member 180 has a cylindrical inner surface 230 which is in abutting engagement with the cylindrical outer surface 184 of the inner ring 160. A cylindrical outer surface 232 of the elastomeric member 180 adjoins but is spaced from the cylindrical inner surface 192 of the outer ring 170, as described below. The outer surface 232 of the elastomeric member 180 extends parallel to the inner surface 230 of the elastomeric member.

Four axially extending grooves 240 are formed on the outer surface 232 of the elastomeric member 180. The grooves 240 project radially inward in a direction toward the inner ring 160. The grooves 240 do not extend all the way to the inner ring 260. Each groove 240 is defined by first and second non-parallel side surfaces 242 and 244 which are connected by an inner end surface 246 extending parallel to the axis 42. Each groove 240 receives a respective rib 200 of the outer ring 170.

The cylindrical inner surface 192 of the outer ring 170 and the cylindrical outer surface 184 of the inner ring 160 define between them an annulus 250. The elastomeric member 180 substantially fills the annulus 250. The ribs 200 project or protrude into the annulus 250. The grooves 240 are formed because the ribs 200 are in the annulus 250 during molding so that the material from which the elastomeric member 180 is molded does not flow into the space which is occupied by the ribs.

During the process of molding the elastomeric member 180, the inner ring 160 is bonded to the elastomeric member to prevent relative movement between the inner ring and the elastomeric member. A curable adhesive is preferably used where bonding is desired. The outer ring 170 is preferably not bonded to the elastomeric member 180. A release agent may be used in areas where bonding is not desired.

During the molding process, the material of the elastomeric member 180 shrinks circumferentially and also shrinks radially inward toward the axis 42. As a result, a small gap 260 is formed between the outer ring 170 and the elastomeric member 180. The gap 260 extends 360° continuously around the outer circumference of the elastomeric member 180.

Figure 5:
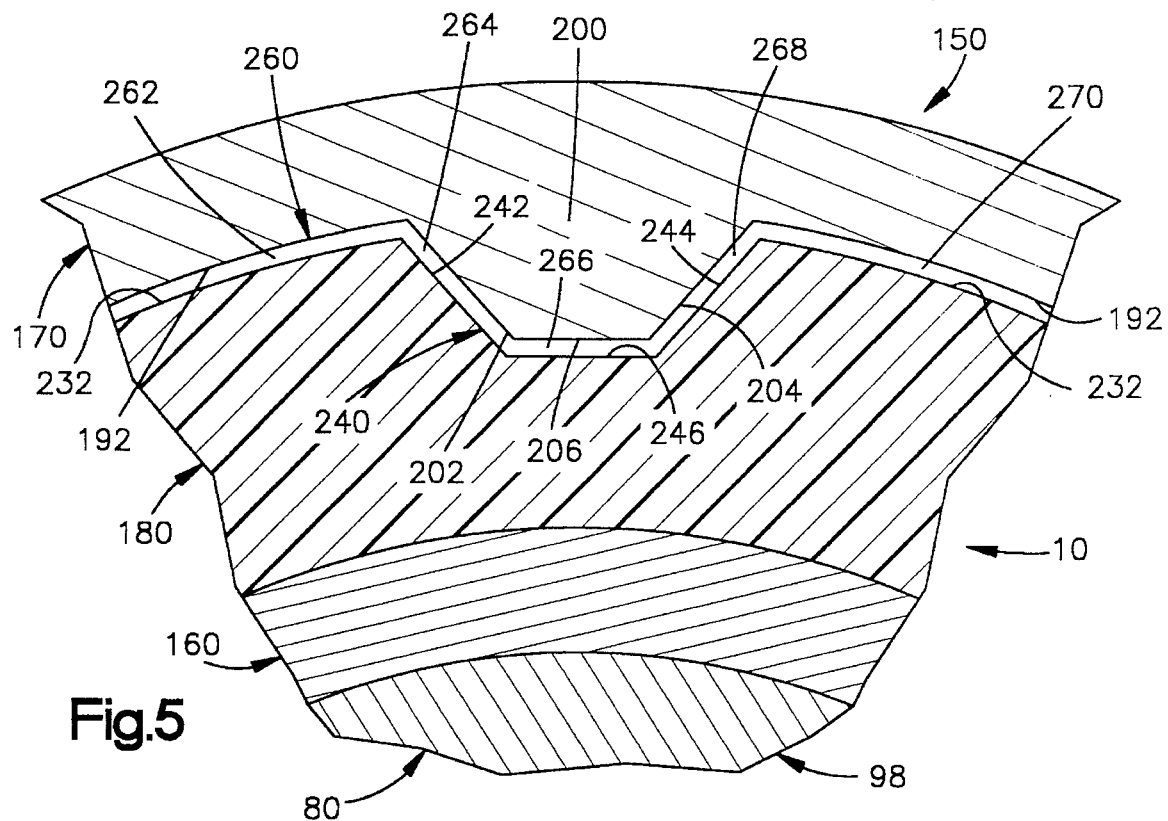
FIG. 5 is an enlarged view of a portion of FIG. 3 showing the damping ring assembly when the control valve is in a centered condition.

FIG. 5 illustrates a section of the gap 260 which includes, for purposes of description, five interconnected portions 262–270. A first portion 262 of the gap 260, to the left of the rib 200 as viewed in FIG. 5, is disposed between the inner surface 192 of the outer ring 170 and the outer surface 232 of the elastomeric member 180. A second portion 264 of the gap 260 is disposed between the left (as viewed in FIG. 5) side surface 202 of the rib 200 and the left side surface 242 of the groove 240.

A third portion 266 of the gap 260 is disposed between the inner end surface 206 of the rib 200 and the inner end surface 246 of the groove 240. A fourth portion 268 of the gap 260 is disposed between the right (as viewed in FIG. 5) side surface 204 of the rib 200 and the right side surface 244 of the groove 240. A fifth portion 270 of the gap 260, to the right of the rib 200 as viewed in FIG. 5, is disposed between the inner surface 192 of the outer ring 170 and the outer surface 232 of the elastomeric member 180.

The actual dimensions of the gap 260 are selected and are predetermined in accordance with the desired operating characteristics of the steering assembly 10. For example, on a steering assembly 10 with a valve core 98 having a diameter of about 25 mm or about one inch, a gap 260 having a radial extent of about 0.1 mm may be appropriate to provide the desired steering feel and amount of damping. The size of the gap 260 determines the amount of relative rotation which is possible between the inner ring 160 and the outer ring 170 prior to engagement of the elastomeric member 180, as described below.

During manufacture of the steering assembly 10, the damping ring assembly 150 is placed in an annular groove 280 (FIG. 3) in the end face 282 of the valve sleeve 100. The groove 280 is defined by a radially extending end surface 284 and an axially extending side surface 286. The damping ring assembly 150, when in the groove 280 in the valve sleeve 100, encircles the valve core 98 on the input shaft 80. The outer ring 170 has a press fit in the valve sleeve 100. The outer side surface 194 of the outer ring 170 is in abutting engagement with the side surface 286 on the valve sleeve 100. The inner ring 160 has a press fit on the valve core 98. The inner surface 182 of the inner ring 160 is in abutting engagement with the cylindrical outer surface 290 on the valve core 98.

As a result, the outer ring 170 of the damping ring assembly 150 is connected for rotation with the valve sleeve 100. The inner ring 160 of the damping ring assembly 150 is connected for rotation with the valve core 98. The elastomeric member 180, which is bonded to the inner ring 160, is connected for movement with the inner ring and is disposed between the inner ring and the outer ring 170.

In operation of the steering assembly 10, hydraulic fluid under pressure is directed through the control valve 86 to cause relative rotation of the valve core 98 and the valve sleeve 100 in the manner described above. In the illustrated power steering assembly 10, the valve core 98 and the valve sleeve 100 are rotatable up to approximately four to six degrees in either direction of rotation from the centered condition shown in FIG. 5.

When the control valve 86 first opens, that is, upon relative rotation between the valve core 98 and the valve sleeve 100 in an amount of up to about one-half degree to one degree, the high pressure fluid flowing through the small passages in the control valve can cause the valve core and the valve sleeve to "chatter", that is, to oscillate rapidly relative to each other. When this movement occurs, the outer ring 170, which is connected for movement with the valve sleeve 100, moves relative to the inner ring 160, which is connected for movement with the valve core 98.

Figure 6:
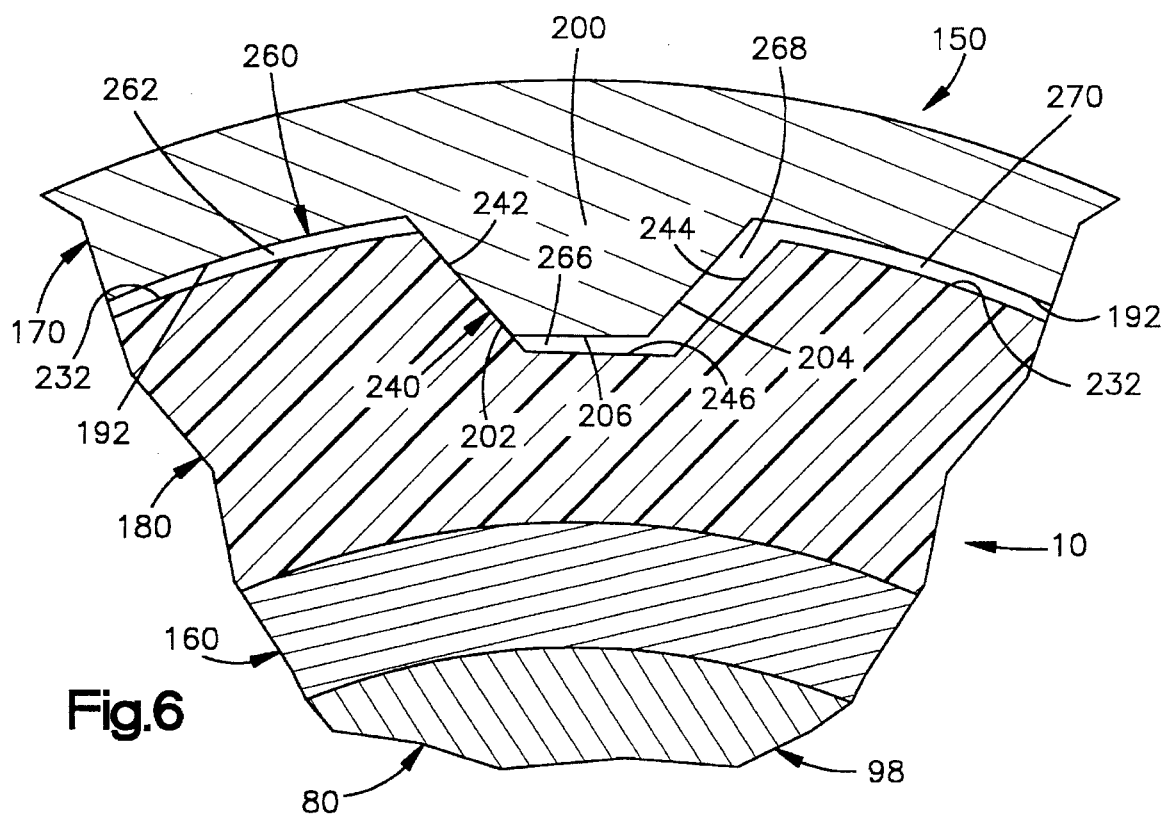
FIG. 6 is a view similar to FIG. 5 showing the damping ring assembly when the control valve is turned from the centered condition.

Rotational movement of the outer ring 170 relative to the inner ring 160 can be resisted by the elastomeric member 180. After about 0.5° of relative rotation between the outer ring 170 and the inner ring 160, the gap portion 264 closes and the elastomeric member 180 engages the ribs 200 on the outer ring as seen in FIG. 6. Specifically, one set of the side surfaces on the elastomeric member 180, such as the left side surfaces 242, engage the corresponding set of side surfaces on the ribs 200 of the outer ring 170, such as the left side surfaces 202. The elastomeric member 180 is thus in a force-transmitting relationship with the outer ring 170. As a result, the inner ring 160, which is connected for movement with the elastomeric member 180, is in a force-transmitting relationship with the outer ring 170.

Further relative rotation between the inner ring 160 and the outer ring 170 is at least partially damped by the material of the elastomeric member 180. The elastomeric member 180 is deformed in shear when the inner ring 160 rotates relative to the outer ring 170. Some of the energy of the relative motion between the inner ring 160 and the outer ring 170 is dissipated by the damping ring assembly 150 through viscous damping forces induced through shear deformation of the elastomeric member 180. The energy that is dissipated by the damping ring assembly 150 in this manner would otherwise be expended through undesired relative rotation between the valve sleeve 100 and the valve core 98. The damping ring assembly 150 thus attenuates noise in the steering assembly 10 by damping vibrations of the valve core 98 relative to the valve sleeve 100.

The size of the gap 260 is such that the elastomeric member 180, as noted above, does not engage the ribs 200 until about 0.5° of relative rotation of the valve core 98 and the valve sleeve 100 from the centered condition. During this initial range of turning movement of the steering assembly 10 from the centered condition, the damping ring assembly 150 does not resist or damp relative rotation of the valve core 98 and the valve sleeve 100. Accordingly, when the steering assembly 10 is in or is close to the centered condition, the damping ring assembly 150 does not affect the relationship between the driver input to the steering assembly and the amount of power assistance provided by the steering assembly.

From the above description of the invention, those skilled in the art will perceive improvements, changes and modifications in the invention. For example, the projecting portion of the outer ring 170 need not be in the shape of the ribs 200 but could be in any other shape suitable for molding of the elastomeric member 180. Also, the ribs 200 or other projections could be formed on the inner ring 160 to project in a direction toward the outer ring 170, or such ribs or projections could be formed on both the inner ring and the outer ring. Such improvements, changes and modifications within the skill of the art are intended to be covered by the appended claims.

Having described the invention, I claim:

1. A hydraulic power steering apparatus comprising:

a rotatable input member;

a rotatable output member;

a housing supporting said input member and said output member for rotation relative to each other about an axis;

a hydraulic valve comprising a valve core and a valve sleeve;

said valve core having a cylindrical surface and being supported in said housing for rotation with said input member relative to said output member and to said valve sleeve;

said valve sleeve having a cylindrical surface adjoining said cylindrical surface of said valve core, said valve sleeve being supported in said housing for rotation with said output member relative to said input member and to said valve core;

said valve having a centered condition in which said valve core and said valve sleeve are in a predetermined first relative position; and said apparatus comprising noise attenuating means for attenuating noise caused by vibrations of said valve core relative to said valve sleeve, said noise attenuating means comprising a damping ring assembly extending circumferentially between said valve core and said valve sleeve;

said damping ring assembly comprising first and second tubular members which are spaced apart radially from each other and which define between them an annulus, each one of said first and second tubular members being connected for rotation with a respective one of said valve core and said valve sleeve;

said damping ring assembly further comprising at least one bearing member which is disposed in said annulus and which is connected for movement with said first tubular member;

said damping ring assembly further comprising an elastomeric member which is disposed in said annulus and which is connected for movement with said second tubular member;

said bearing member being spaced apart from said elastomeric member when said valve is in the centered condition;

said bearing member being engageable with said elastomeric member, upon movement of said valve from the centered condition, to transmit rotational force between said bearing member and said elastomeric member and thereby between said first and second tubular members.

2. An apparatus as set forth in claim 1 wherein said first tubular member comprises a metal ring having an annular main body portion, said bearing member comprising at least one projection projecting from said main body portion in a direction toward said second tubular member.

3. An apparatus as set forth in claim 2 wherein said projection comprises a plurality of circumferentially spaced, axially extending ribs formed on said first tubular member and projecting radially toward said second tubular member, each one of said ribs being received in a respective groove formed on said elastomeric member, said damping ring assembly comprising a gap between each one of said ribs and its associated groove when said valve is in the centered condition.

4. An apparatus as set forth in claim 1 wherein said elastomeric member has a generally annular configuration and substantially fills said annulus, said damping ring assembly comprising a gap between said elastomeric member and said first tubular member when said valve is in the centered condition.

5. A hydraulic power steering apparatus comprising:

a rotatable input member;

a rotatable output member;

a housing supporting said input member and said output member for rotation relative to each other about an axis;

a hydraulic valve comprising a valve core and a valve sleeve;

said valve core having a cylindrical surface and being supported in said housing for rotation with said input member relative to said output member and to said valve sleeve;

said valve sleeve having a cylindrical surface adjoining said cylindrical surface of said valve core, said valve sleeve being supported in said housing for rotation with said output member relative to said input member and to said valve core;

said valve having a centered condition in which said valve core and said valve sleeve are in a predetermined first relative position; and said apparatus comprising noise attenuating means for attenuating noise caused by vibrations of said valve core relative to said valve sleeve, said noise attenuating means comprising a damping ring assembly extending circumferentially between said valve core and said valve sleeve;

said damping ring assembly comprising first and second tubular members which are spaced apart radially from each other and which define between them an annulus, each one of said first and second tubular members being connected for rotation with a respective one of said valve core and said valve sleeve;

said damping ring assembly further comprising at least one bearing member which is disposed in said annulus and which is connected for movement with said first tubular member;

said damping ring assembly further comprising an elastomeric member which is disposed in said annulus and which is connected for movement with said second tubular member;

said bearing member being spaced apart from said elastomeric member when said valve is in the centered condition;

said bearing member being engageable with said elastomeric member, upon movement of said valve from the centered condition, to transmit rotational force between said bearing member and said elastomeric member and thereby between said first and second tubular members;

said first tubular member comprising a metal ring having an annular main body portion, said bearing member comprising a plurality of circumferentially spaced, axially extending ribs formed on said first tubular member and projecting radially toward said second tubular member, each one of said ribs being received in a respective groove formed on said elastomeric member, said damping ring assembly comprising a gap between each one of said ribs and its associated groove when said valve is in the centered condition.

6. A hydraulic power steering apparatus comprising:

a rotatable input member;

a rotatable output member;

a housing supporting said input member and said output member for rotation relative to each other about an axis;

a hydraulic valve comprising a valve core and a valve sleeve;

said valve core having a cylindrical surface and being supported in said housing for rotation with said input member relative to said output member and to said valve sleeve;

said valve sleeve having a cylindrical surface adjoining said cylindrical surface of said valve core, said valve sleeve being supported in said housing for rotation with said output member relative to said input member and to said valve core;

said valve having a centered condition in which said valve core and said valve sleeve are in a predetermined first relative position; and said apparatus further comprising noise attenuating means for attenuating noise caused by vibrations of said valve core relative to said valve sleeve, said noise attenuating means comprising a damping ring assembly extending circumferentially between said valve core and said valve sleeve;

said damping ring assembly comprising first and second tubular members which are spaced apart radially from each other and which define between them an annulus, each one of said first and second tubular members being connected for rotation with a respective one of said valve core and said valve sleeve;

said damping ring assembly further comprising a damping member in said annulus between said first and second tubular members and means for selectively connecting said damping member in a force-transmitting relationship between said first and second tubular members.

7. An apparatus as set forth in claim 6 wherein said means for selectively connecting said damping member in a force-transmitting relationship between said first and second tubular members comprises:

a projecting portion of said first tubular member which projects in a direction toward said second tubular member; and an engagement surface on said damping member adjoining said projecting portion of said first tubular member;

said engagement surface on said damping member and said projecting portion of said first tubular member having a first condition, when said valve is in the centered condition, in which said engagement surface is spaced apart from said projecting portion to define a gap between said engagement surface and said projecting portion;

said engagement surface on said damping member and said projecting portion of said first tubular member being movable, upon a predetermined amount of relative rotation of said valve core and said valve sleeve, from the first condition to a second condition in which said engagement surface on said damping member is in engagement with said projecting portion of said first tubular member to damp relative rotational movement between said valve core and said valve sleeve.

8. An apparatus as set forth in claim 7 wherein said damping member comprises an elastomeric member having an annular configuration and having a recess which receives said projecting portion of said first tubular member, said recess having a radial extent which is less than the radial extent of said elastomeric member.

9. An apparatus as set forth in claim 7 wherein said engagement surface on said elastomeric member is engageable with said projecting portion of said first tubular member upon about one-half degree of relative rotational movement between said valve core and said valve sleeve.

10. A hydraulic power steering apparatus as set forth in claim 6 wherein said damping member comprises an elastomeric member having an annular configuration and having surfaces defining a recess which receives a radially projecting portion of said first tubular member, said recess having a radial extent which is less than the radial extent of said elastomeric member;

said surfaces defining said recess on said elastomeric member being engageable with said projecting portion of said first tubular member upon about one-half degree of movement of said valve from the centered condition.

* * * * *